US011812126B2

(12) United States Patent
Hill et al.

(10) Patent No.: US 11,812,126 B2
(45) Date of Patent: Nov. 7, 2023

(54) EYE CARTRIDGE (71) Applicant: SANCTUARY COGNITIVE SYSTEMS CORPORATION, Vancouver (CA)

(72) Inventors: Matthew Steven Hill, Vancouver (CA); Connor Richard Shannon, Vancouver (CA); Nigel Adrien Myers, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 319 days.

(21) Appl. No.: 17/158,244

(22) Filed: Jan. 26, 2021

(65) Prior Publication Data

US 2021/0234997 A1 Jul. 29, 2021

Related U.S. Application Data (60) Provisional application No. 62/966,347, filed on Jan. 27, 2020.

(51) Int. Cl.
*H04N 23/54* (2023.01)
*G05D 1/02* (2020.01)
*H04N 23/60* (2023.01)
*H04N 23/90* (2023.01)

(52) U.S. Cl.
CPC .......... *H04N 23/54* (2023.01); *G05D 1/0246* (2013.01); *H04N 23/60* (2023.01); *H04N 23/90* (2023.01)

(58) Field of Classification Search
CPC ........ H04N 23/54; H04N 23/90; H04N 23/60; G05D 1/0246

USPC ........................................................ 348/159
See application file for complete search history.

(56) References Cited

U.S. PATENT DOCUMENTS

| 5,966,991 | A | * | 10/1999 | Gosselin | H01Q 3/08 |
| | | | | | 248/661 |
| 8,930,019 | B2 | * | 1/2015 | Allen | G06F 1/1632 |
| | | | | | 700/250 |
| 2007/0062321 | A1 | * | 3/2007 | Chablat | B23Q 1/5462 |
| | | | | | 74/490.01 |
| 2010/0320356 | A1 | * | 12/2010 | Maillard | G02B 7/1824 |
| | | | | | 248/278.1 |
| 2012/0022688 | A1 | * | 1/2012 | Wong | G06N 3/008 |
| | | | | | 700/253 |
| 2012/0103123 | A1 | * | 5/2012 | McInroy | B25J 9/0072 |
| | | | | | 74/479.01 |

(Continued)

*Primary Examiner* — Matthew David Kim
(74) *Attorney, Agent, or Firm* — Thomas Mahon; Adenike Adebiyi (57) ABSTRACT

A detachable mechanical eye cartridge includes a plurality of links, a plurality of couplers, a plurality of electronic connection points, and at least one mechanical eye that can be rotatably actuated in at least two rotational degrees of freedom. The detachable mechanical eye cartridge may include actuators for actuating the eye, eyelid structures, an actuator for actuating the eyelid structures, and imaging sensors within the mechanical eye. The detachable mechanical eye cartridge may include one or two mechanical eyes and related structures and may include a set of magnetic couplers that couple to magnets on a robotic head frame to which the detachable mechanical eye cartridge may couple. The detachable mechanical eye cartridge may also have a set of mechanically coupled linkages for controlling the pitch of each mechanical eye with minimal backlash.

20 Claims, 9 Drawing Sheets

(56) References Cited

U.S. PATENT DOCUMENTS

| | | | |
|---|---|---|---|
| 2015/0002637 A1* | 1/2015 | Jang | H04N 13/25 |
| | | | 348/47 |
| 2015/0082934 A1* | 3/2015 | Trui | B25J 9/0048 |
| | | | 901/15 |
| 2015/0165336 A1* | 6/2015 | Michalowski | A63H 29/22 |
| | | | 446/330 |
| 2016/0127643 A1* | 5/2016 | Huerta | H01R 35/04 |
| | | | 439/8 |
| 2016/0176001 A1* | 6/2016 | Rinaldi | B23Q 1/035 |
| | | | 269/21 |
| 2018/0326312 A1* | 11/2018 | Sufer | A63H 3/001 |
| 2019/0080517 A1* | 3/2019 | You | G06T 7/85 |
| 2019/0381415 A1* | 12/2019 | McMullen | A63H 33/26 |

\* cited by examiner

EYE CARTRIDGE

FIELD

This disclosure generally relates robots, and in particular to an eye cartridge for use with a humanoid resembling robotic head.

BACKGROUND

Description of the Related Art

Robots are becoming increasingly common in various environments. In many applications the robots do not resemble a human, for example robotic vacuums or robots used on vehicle assembly lines. In other applications the robots may resemble a human, for example having a distinct torso, head, and one or more limbs. In such applications, it is typically desirable to have the robot resemble a human as closely as possible, for example including a skin that resembles human skin, and employing gestures and even facial expressions that mimic those of a human. Such humanoid resembling robots are typically highly complex assemblies of various subsystems and/or components. For example, humanoid resembling robots may have subsystems for sensing the environment in which they operate, for example one or more cameras, microphones, proximity sensors, or even LIDAR. Also for example, humanoid resembling robots may have subsystems that provide for human like movement of the torso, head and/or limbs, or even parts of the torso, head and/or limbs. The complexity can render these humanoid resembling robots difficult to maintain or repair. The ability to efficiently and cost effectively maintain or repair humanoid resembling robots will affect the commercial adoption of such robots.

BRIEF SUMMARY

A modular robotic head with a detachable eye cartridge that enables the easy maintenance of the complex eye mechanism without full disassembly of the robotic head. The eye cartridge implementation includes actuators and linkages that are operable to rotate a mechanical eyeball and a mechanical eyelid. The eye cartridge connects into at least one socket of the robotic head, and employs a magnetic connection and spring-loaded electrical contacts. The eye cartridge may also have one or more image sensors coupled to the mechanical eyeball such that a video feed from the point of view of the mechanical eyeball can be captured.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed implementations and embodiments. However, one skilled in the relevant art will recognize that implementations and embodiments may be practiced without one or more of these specific details, or with other methods, components, materials, etc. In other instances, certain structures associated with robots, robotic appendages, linkages, sensors, fasteners, couplers, and cables or actuators have not been shown or described in detail to avoid unnecessarily obscuring descriptions of the implementations or embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one implementation" or "an implementation" or to "one embodiment" or "an embodiment" means that a particular feature, structure, component, or characteristic described in connection with the implementation or embodiment is included in at least one implementation or embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, component, or characteristics may be combined in any suitable manner in one or more implementations or embodiments.

The terms "apparatus" and "mechanism" are used interchangeably herein.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Described herein is an example implementation of a mechanism or apparatus that approximates the functionality of a human eye or eyes with the added advantage of modularity and detachability for simplified replacement or maintenance. Those skilled in the art would recognize that many features of the implementation can be grouped together, split apart, reorganized, removed, or duplicated. While useful in robotics, for instance as a robotic eye structure, the mechanism can be used in a variety of other practical applications.

Figure 1:
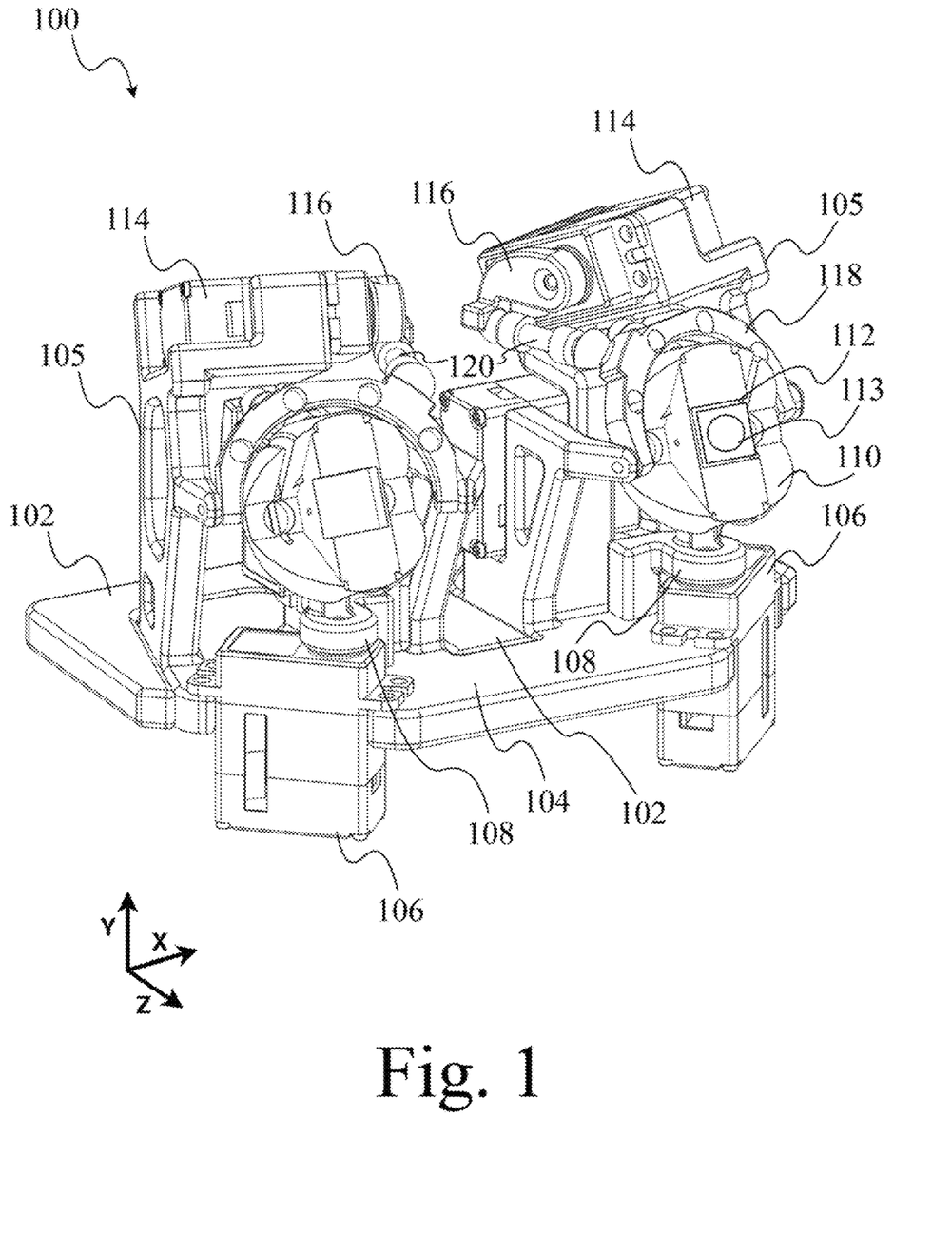
FIG. 1 is a front, right, top, isometric view of a robotic head frame and an eye cartridge according to at least one illustrated implementation.
Figure 2:
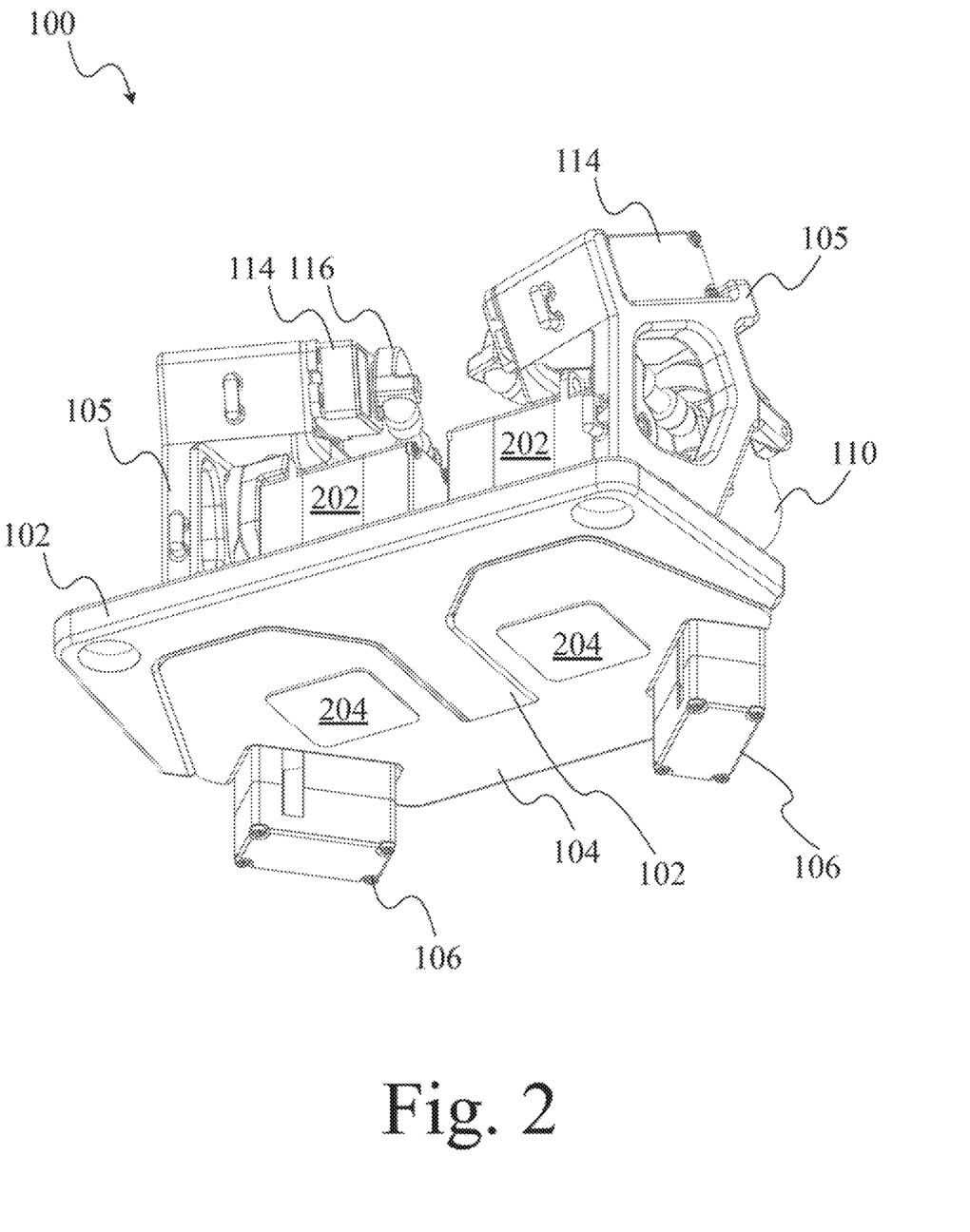
FIG. 2 is a rear, right, bottom, isometric view of the robotic head frame and eye cartridge of FIG. 1.

FIGS. 1 and 2 illustrate a robotic head frame and eye cartridge system 100, according to at least one illustrated implementation.

The robotic head frame and eye cartridge system 100 comprises a head frame 102 and an eye cartridge 104 removably or detachably coupled to the head frame 102. The eye cartridge 104 illustrated in FIGS. 1 and 2 include two mechanical eyes, including corresponding structure to rotate the mechanical eyes.

As best illustrated in FIG. 1, the eye cartridge 104 has a left side and right side, with the left side being in a negative x direction from a center of the eye cartridge 104 and the right side being in a positive x direction from the center of the eye cartridge 104. In this implementation, the eye cartridge has mirror symmetry across an Z-Y plane. The eye cartridge 104 includes a frame 105, a number of actuators, a number of linkages, a number of couplers, a number of electrical contacts, and electrical or electronic circuitry.

A set of two yaw actuators 106 are coupled to the eye cartridge 104. Each of the yaw actuators 106 controls the rotation of a respective yaw member 108 around a respective vertical axis. Each yaw member 108 is coupled to a respective eye feature area 110 such that a yaw of each eye feature area 110 is coupled to the yaw of the respective yaw member 108.

Each eye feature area 110 comprises a sensor area 112 where an image sensor 113 may be coupled to the eye feature area 110. While only one image sensor 113 is illustrated in FIG. 1, each eye feature area 110 may include one or more image sensors 113.

A set of two eyelid actuators 114 are coupled to the frame 105 of the eye cartridge 104. Each of the two eyelid actuators 114 controls a rotation of a respective eyelid member 116 around a respective horizontal axis. Each eyelid member 116 is coupled via a respective eyelid coupler 120 to rotate a respective eyelid structure 118 such that the pitch of each eyelid structure 118 is controlled by the actuation of the respective eyelid actuator 114. A respective eyelid membrane (e.g., a silicone membrane) may be coupled to respective ones of the eyelid structures 118 to resemble in look and operation and human eyelid. The eyelid membrane may be sized to occlude a portion of all of the eye feature when closed, while not occluding the portion of the eye feature when open. The eyelid membrane may have folds or wrinkles to further mimic the appearance of a human eyelid.

As best illustrated in FIG. 2, the eye cartridge 104 further comprises a set of two pitch actuators 202, each coupled to the respective eye feature area 110 through a respective set of links such that the pitch of the respective eye feature area 110 is controlled by the actuation of one of the pitch actuators 202. The coupling between the pitch actuator 202 and the respective eye feature area 110 is better illustrated in FIGS. 8 and 9. Other implementations may have a single pitch actuator coupled to both eye feature areas 110.

The eye cartridge 104 in this implementation further comprises a set of electronic circuits 204 which may include a printed circuit board, controller, computer, processor, memory, and/or other electronic circuitry. The set of electronic circuits 204 is electrically coupled to the actuators and image sensors carried by eye cartridge 104, for example actuators 106, 114, and 202, and image sensor 113, to control the actuators and to receive image data or information captured by the image sensor(s) 113.

Figure 3:
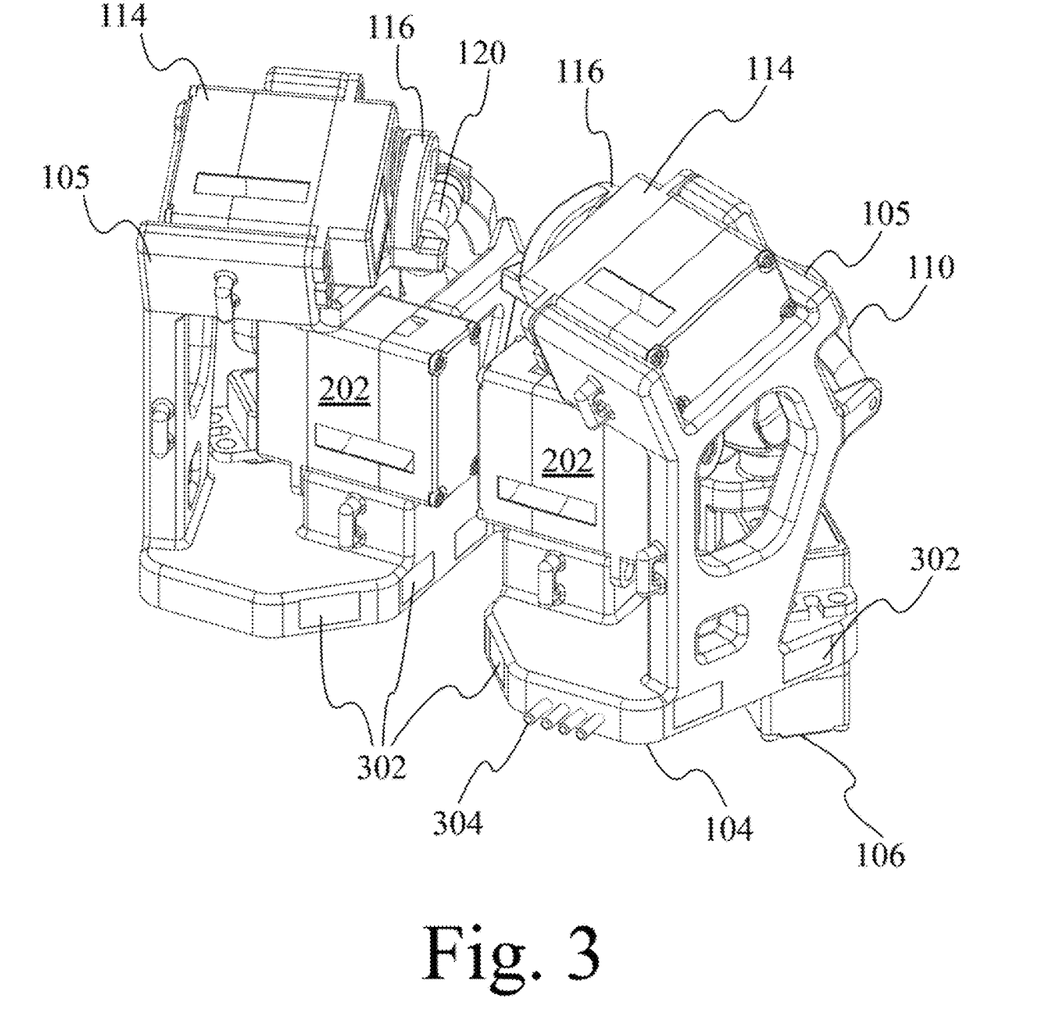
FIG. 3 is a rear, right, top, isometric view of the eye cartridge of FIGS. 1 and 2.

FIG. 3 illustrates the eye cartridge 104 with the head frame 102 omitted.

The eye cartridge 104 further comprises a first set of couplers 302 which in this implementation comprise a set of rare earth magnets or ferrous metal, and thus may be denominated as magnetic couplers. Other implementations may comprise a variety of other couplers, for example mechanical couplers such as clips, hooks, fasteners, ferrous metals, or friction-fit surfaces.

The eye cartridge 104 further comprises a plurality of electrical contacts 304 which are electrically coupled to the electronic circuitry 204. In other implementations, the electrical contacts may electrically couple directly to some or all the actuators and/or sensors on the eye cartridge 104. In this implementation, the electrical contacts 304 comprise a set of spring-loaded metal pins, but other implementations may comprise a variety of other electrical connections, such as contact pads, pins, sockets, and plugs.

Figure 4:
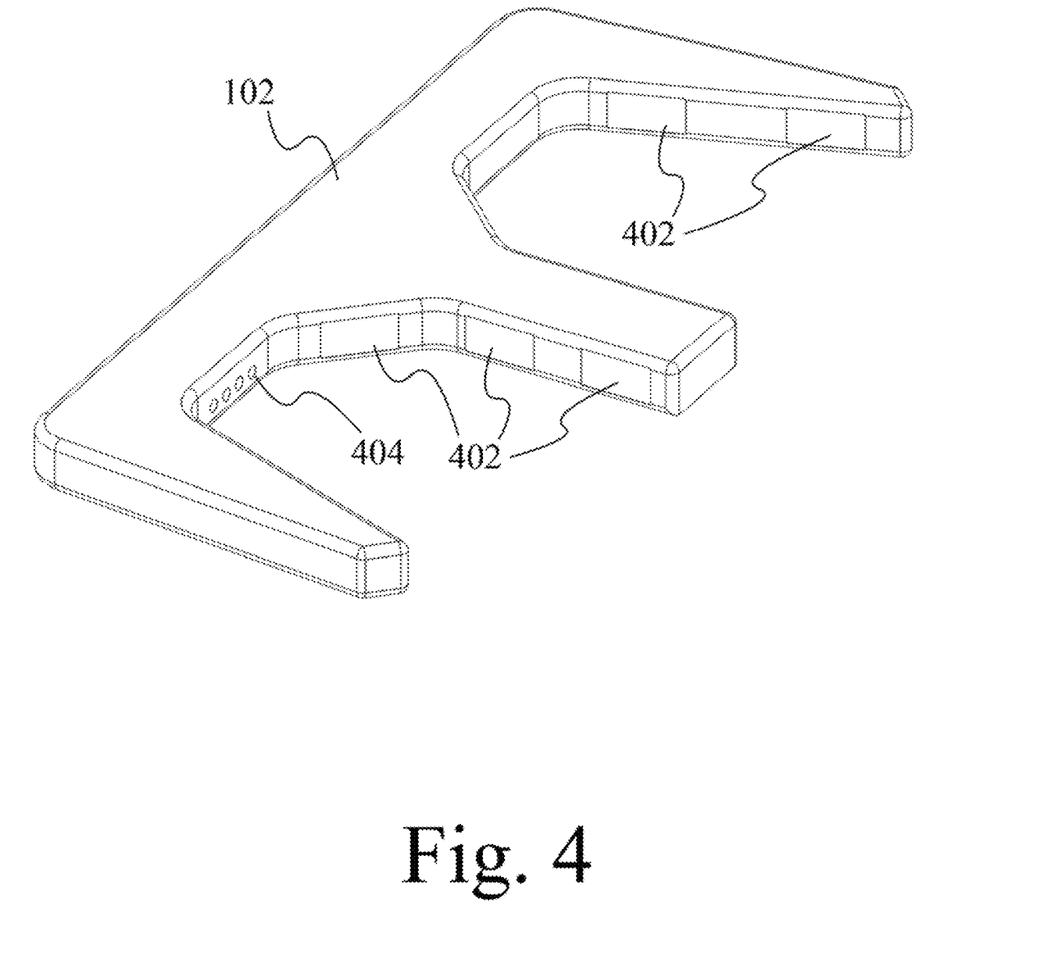
FIG. 4 is a front, right, top, isometric view of the robotic head frame of FIGS. 1 and 2.

FIG. 4 illustrates the robotic head frame with the eye cartridge 104 omitted.

The head frame 102 further comprises a second set of couplers 402, complementary to the first set of couplers, and which in this implementation comprise a set of magnetic couplers for instance rare earth magnets or ferrous. Other implementations may comprise a variety of other couplers, for example complementary mechanical couplers such as clips, hooks, fasteners, ferrous metals, or friction-fit surfaces. The rare earth magnets or ferrous metal are orientated such that they magnetically attract the corresponding magnets on the eye cartridge 104.

The eye head frame 102 further comprises a plurality of complementary electrical contacts 404 which are positioned such that the electrical contacts 404 electrically couple to corresponding ones of the electrical contacts 304 on the eye cartridge 104. In this implementation, the electrical contacts 404 comprise a set of metal pads, but other implementations may comprise a variety of other electrical connections, for example spring-loaded pins, contact pins, sockets, and plugs.

Figure 5:
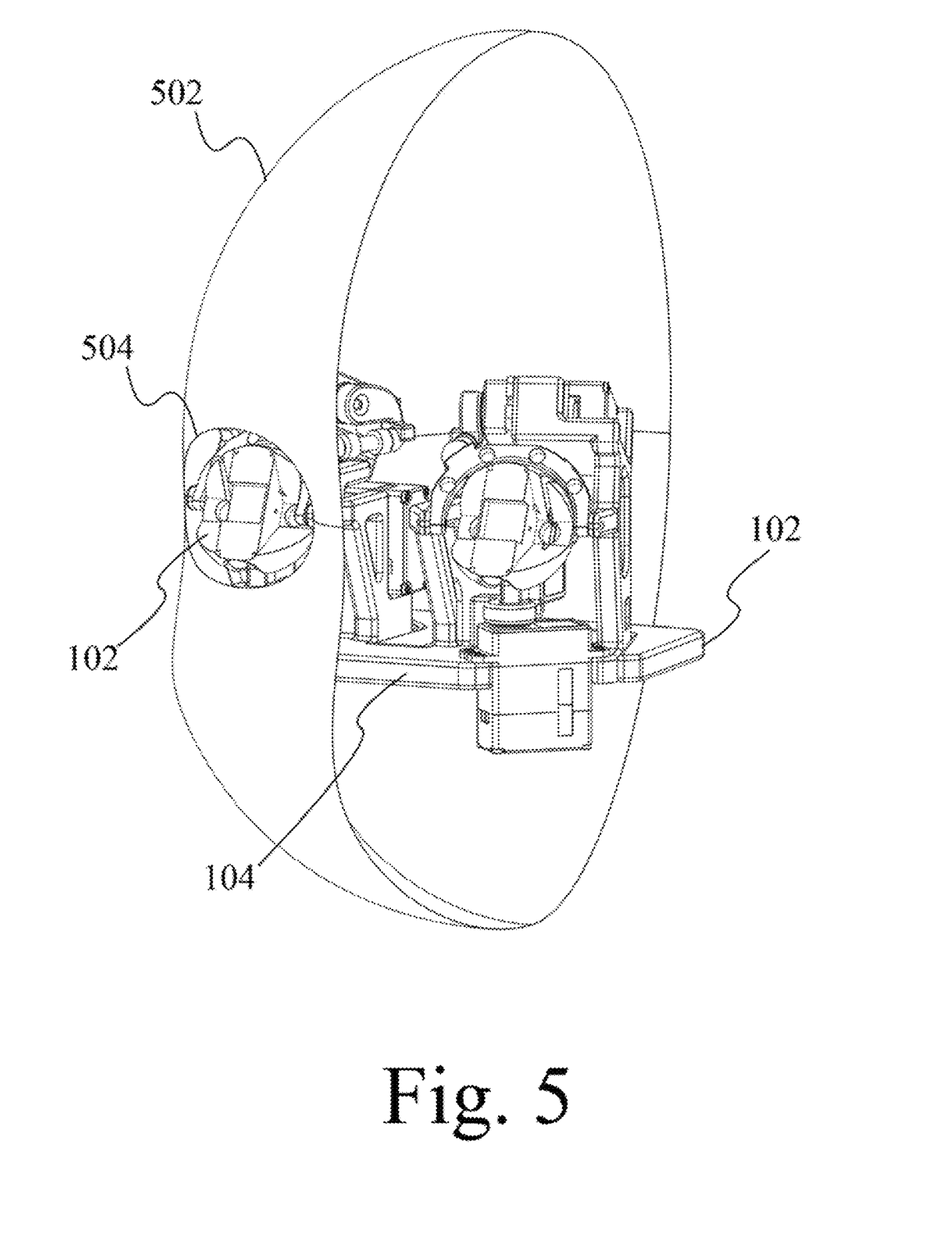
FIG. 5 is a front, right, top, isometric view of the robotic head frame and eye cartridge of FIGS. 1 and 2 positioned in a robotic head shell, according to at least one illustrated implementation.

FIG. 5 illustrates the robotic head frame and eye cartridge system 100 positioned in robotic head shell 502, according to at least one illustrated implementation.

The robotic head shell 502 is shown to illustrate the side, location, and orientation of robotic head frame and eye cartridge system 100 as positioned within a robotic head with a half of the robotic head shell 502 cut away to better illustrate the relative positions, particularly of the eye feature area 110. The robotic head shell 502 comprises an eye hole 504 which is large enough for both the eye feature area 110 (FIG. 1) and eyelid structure 118 (FIG. 2) to have freedom of movement.

Figure 6:
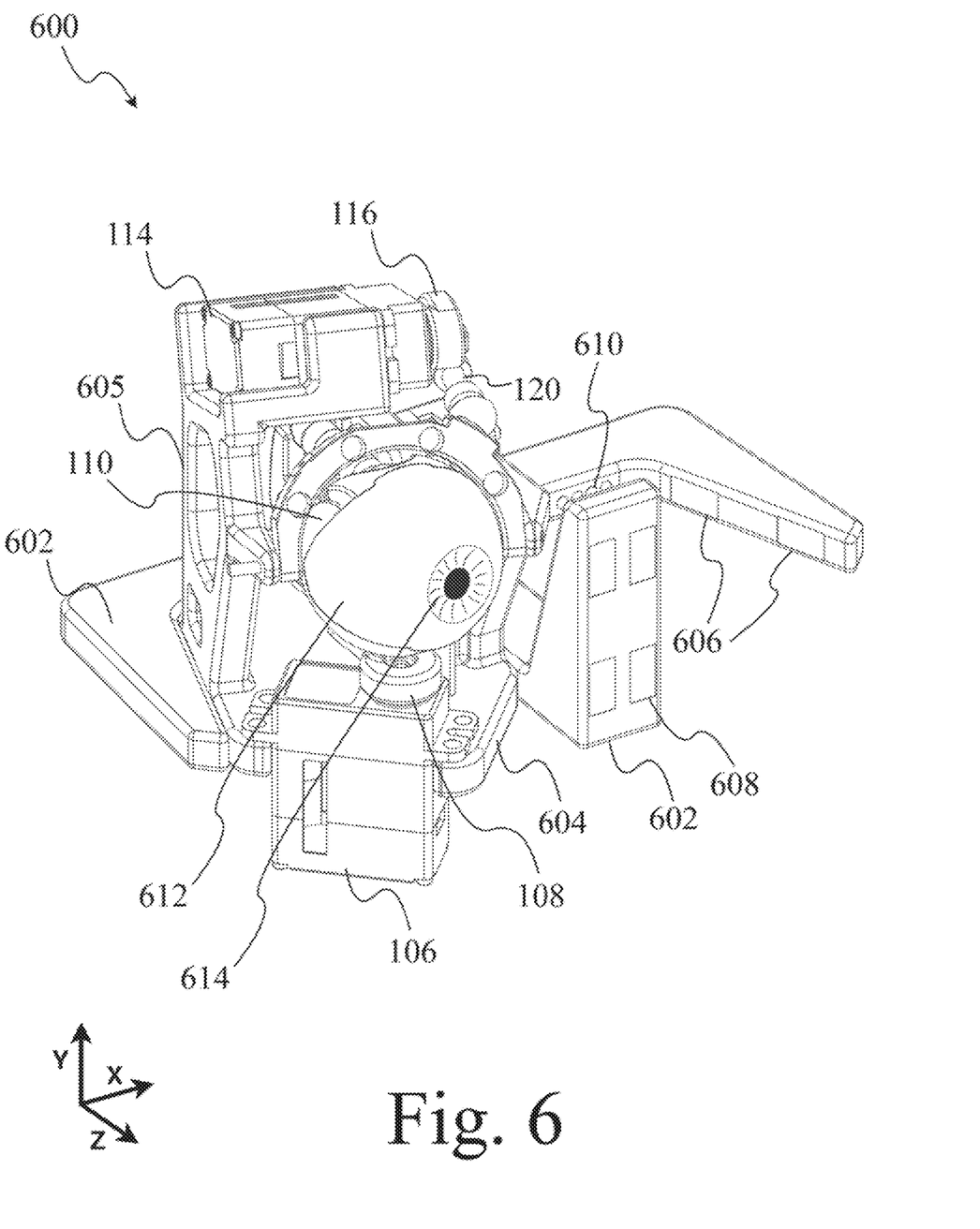
FIG. 6 is a front, right, top, isometric view of the robotic head frame and one of two separate eye cartridges which includes an eye feature that resembles a portion of a human eyeball coupled to be rotated by other portions of the eye cartridge, according to another illustrated implementation.

FIG. 6 illustrates a robotic head frame and eye cartridge system 600, according to at least one illustrated implementation.

This implementation of the head frame and eye cartridge system 600 comprises a head frame 602 that comprises two sockets each capable of receiving a respective eye cartridge 604 (only one shown) with each eye cartridge 604 comprising a frame 605, a number of actuators, a number of linkages, a number of couplers, a number of electrical contacts, and electrical or electronic circuitry for a single eye. In contrast to the eye cartridge 104 (FIGS. 1 and 2), each eye cartridge 604 includes a respective mechanical eye, including corresponding structure to rotate the mechanical eye.

Figure 7:
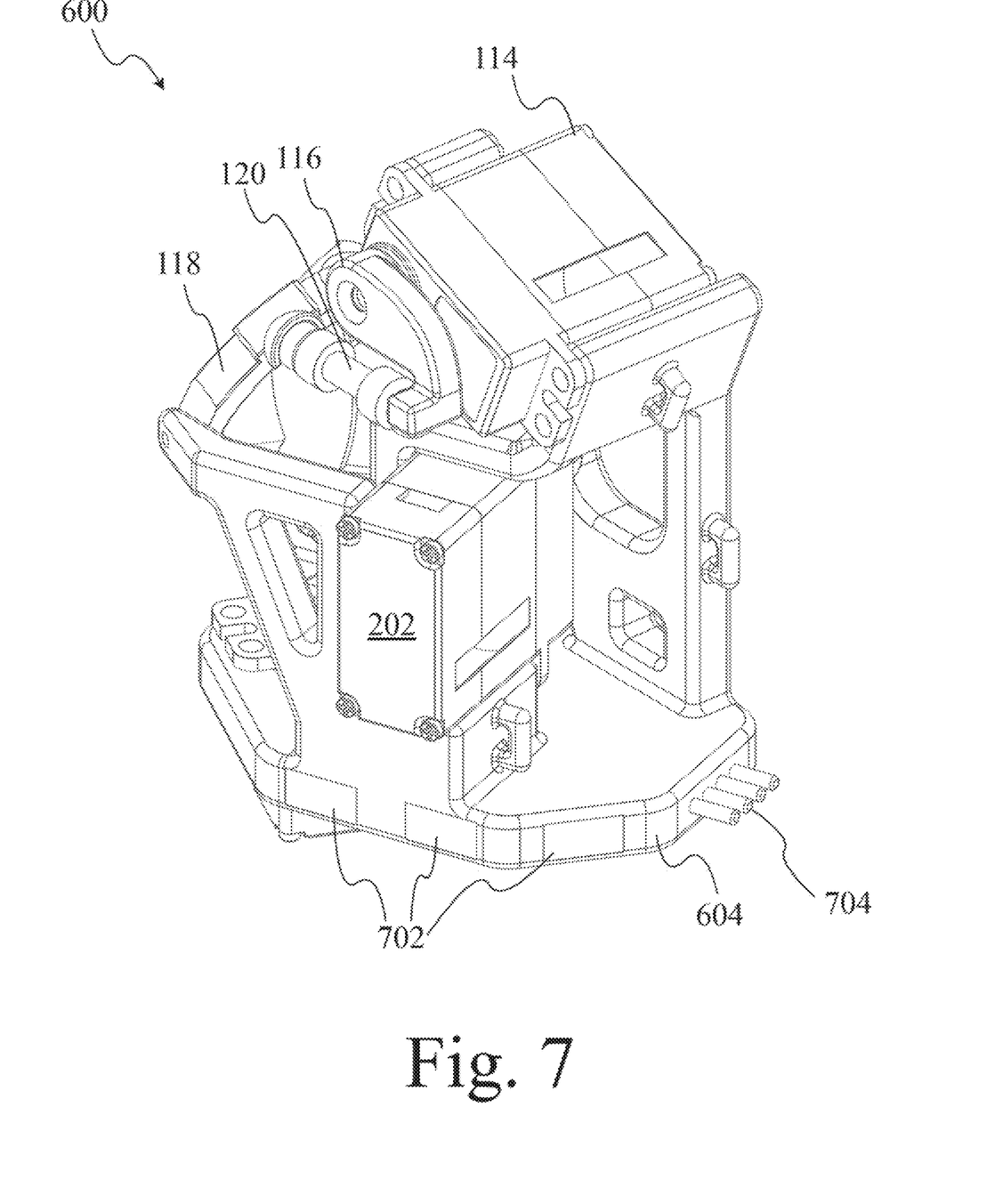
FIG. 7 is a rear, left, top, isometric view of the eye cartridge of FIG. 6.

The head frame 602 comprises a first set of couplers 606, which in this implementation comprise a set of magnetic couplers for instance rare earth magnets or ferrous metal. Other implementations may comprise a variety of other couplers, for example mechanical couplers such as clips, hooks, fasteners, ferrous metals, or friction-fit surfaces. The rare earth magnets or ferrous metal are orientated such that they magnetically attract corresponding magnets or ferrous metal on the eye cartridge 604 (FIG. 7). The head frame 602 also comprises set of couplers 608 for detachable or removable coupling of a nose or other facial features, and a set of electrical contacts 610 at each eye-cartridge socket.

The eye cartridge 604 includes a set of components that are identical or similar to the components illustrated and described with respect to eye cartridge 104 such as actuators 106, 114, and 202, as well as an eye feature area 110 and related members and linkages.

An eye feature 612 is detachably or removably coupled to the eye feature area 110, the eye feature having an appearance resembling that of a human eyeball. The eye feature 612 comprises an iris 614 having an appearance resembling that of a human iris. The iris 614 may have a transparent area through which a scene can be captured by an image sensor positioned in the eye feature area spaced relatively behind or inward of the eye feature 612.

FIG. 7 further illustrates the eye cartridge 604 of FIG. 6.

The eye cartridge 604 further comprises a first set of couplers 702 which in this implementation comprise a set of magnetic couplers, for instance rare earth magnets or ferrous metal. Other implementations may comprise a variety of other couplers, for example mechanical couplers such as clips, hooks, fasteners, or friction-fit surfaces. The rare earth magnets and/or ferrous metal are orientated such that they magnetically attract the corresponding magnets or ferrous metal on the head frame 602.

The eye cartridge 604 further comprises a plurality of electrical contacts 704 which are electrically coupled to the electrical or electronic circuitry of the eye cartridge 604. The electrical or electronic circuitry is communicatively coupled to the actuators and/or an image sensor of the eye cartridge 604. In other implementations, the electrical contacts 704 may electrically couple directly to some or all the actuators and/or image sensors of the eye cartridge 604. In this implementation, the electrical contacts 704 comprise a set of spring-loaded metal pins, but in other implementations the electrical contacts 704 may comprise a variety of other electrical connections, such as contact pads, pins, sockets, and plugs.

Figure 8:
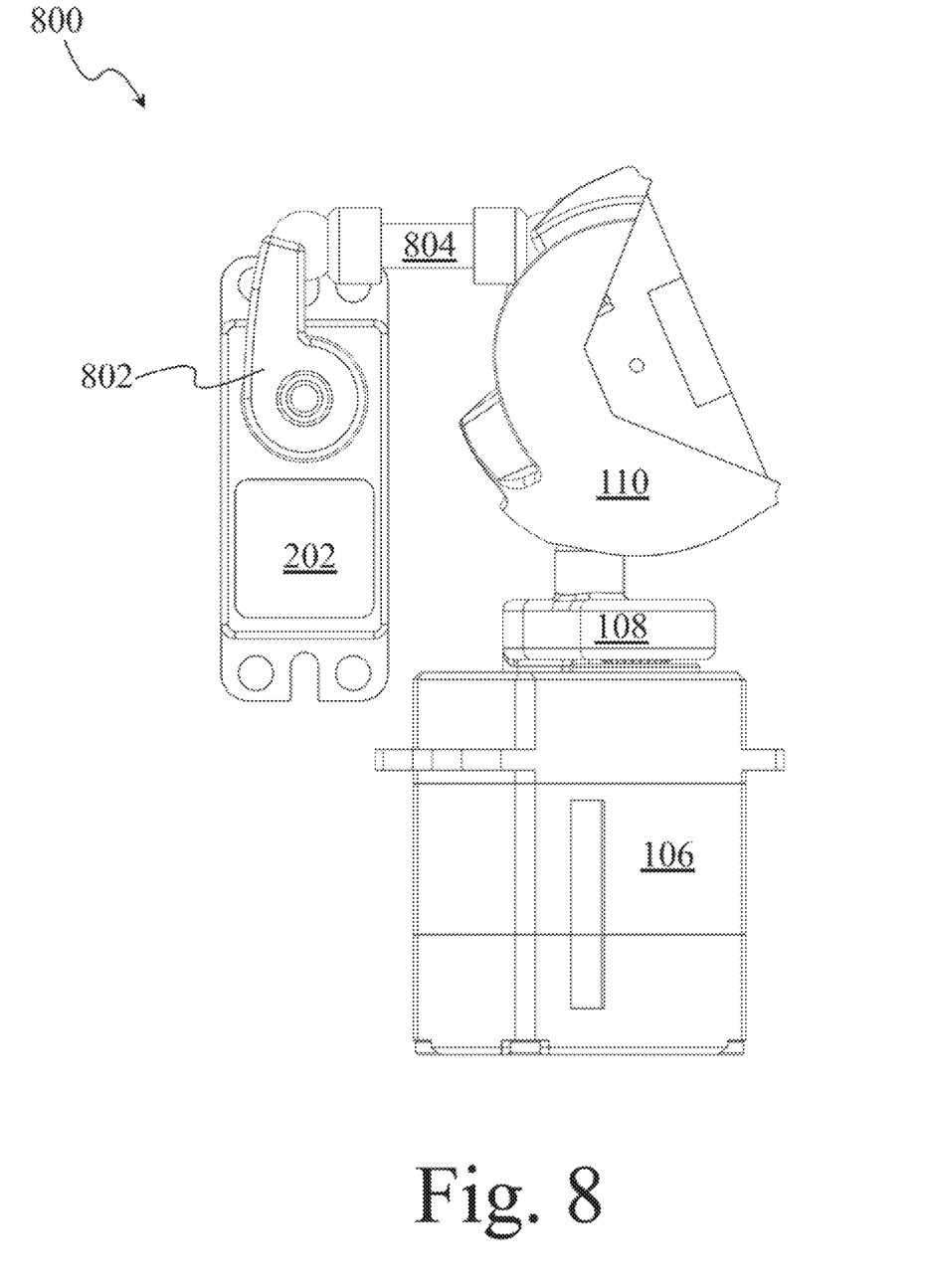
FIG. 8 is a right side elevational view of a portion of the eye cartridge of FIG. 6.
Figure 9:
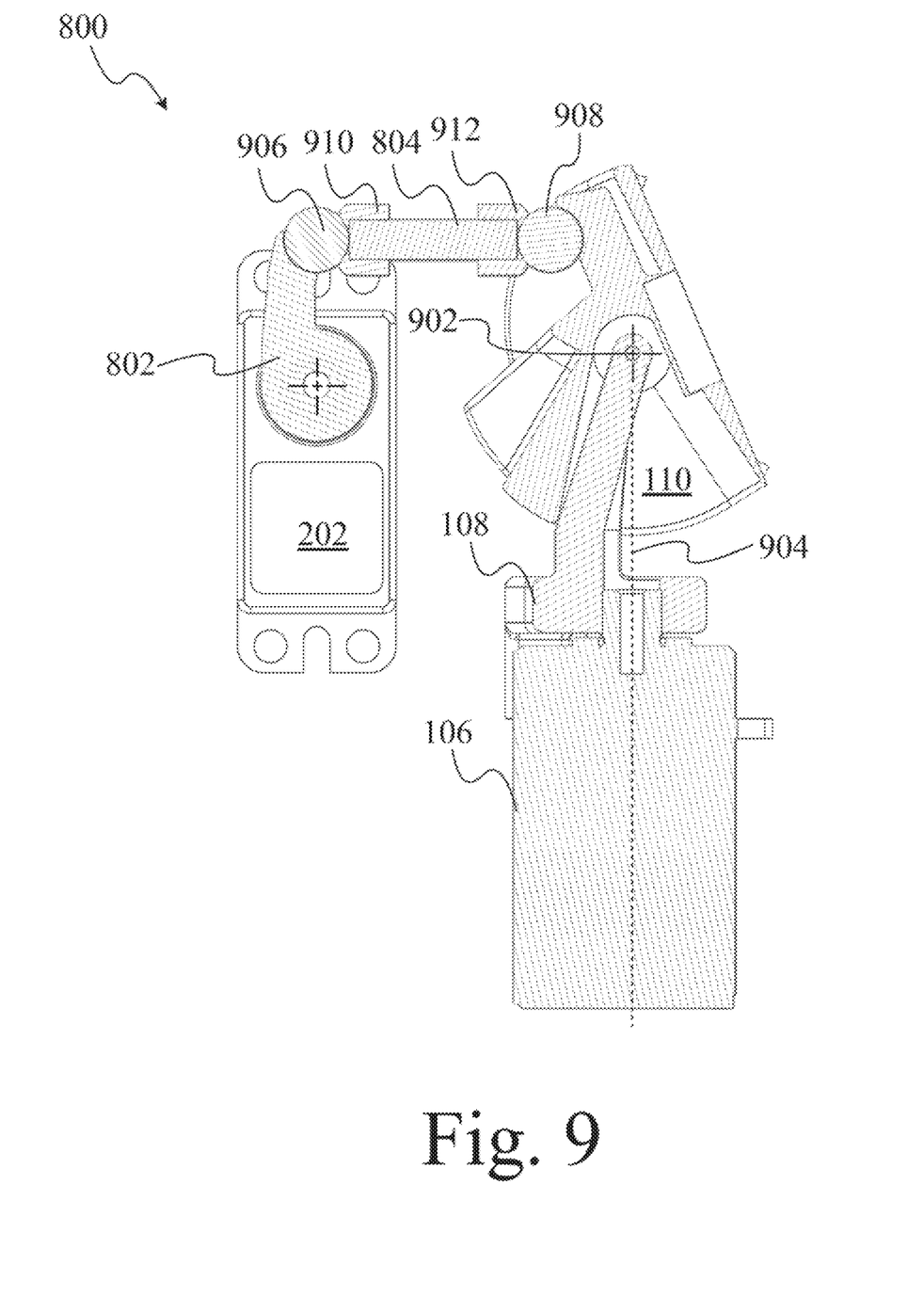
FIG. 9 is a cross-sectional view of the portion of the eye cartridge of FIG. 8.

FIGS. 8 and 9 illustrate a portion of the eye cartridge 604, providing a better view of an eye feature area movement system 800. FIG. 9 is a cross-sectional view is created by slicing system 800 along a Y-Z plane that intersects the eye-feature area 110 at a spherical center of the eye 902. The head frame, eye cartridge frame, and other parts have been omitted from FIGS. 8 and 9 to provide a clear view of the eye movement system 800.

The pitch actuator 202 rotatably actuates a pitch arm 802 which is rotatably coupled to the eye feature area 110 through a pitch linkage 804.

The yaw of the eye around vertical axis 904 is actuated by yaw actuator 106 through yaw member 108. The yaw member 108 may be pinned to the eye feature area at the spherical center of the eye 902. Thus, the yaw of the eye feature area 110 may be directly controlled by the action of the yaw actuator 106 with little or no backlash, while allowing the pitch of the eye feature area 110 to be controlled separately. A ball-bearing 906 made of a ferrous metal may be fixed to the pitch arm 802. The pitch linkage 804 may be a cylindrical magnet that magnetically couples to the ball bearing 906. A ball-bearing 908 may be coupled to eye feature area 110, and the pitch linkage 804 may be magnetically coupled to ball bearing 908. A first guide 910 may be fixed to a first end of the pitch linkage 804 having a rounded side sharing a radius with the ball bearing 906 such that the ball bearing 906 and the pitch linkage 804 stay centered. A second guide 912 may be fixed to a second end of the pitch linkage 804, similarly aligning the pitch linkage 804 with the ball bearing 908. Ball bearings 906 and 908, pitch linkage 804, and guides 910 and 912 are coupled the pitch arm 802 eye feature area 110 such that the pitch of the eye feature area 110 can be independently controlled in yaw by pitch of the pitch arm 802 with no backlash, which is beneficial to the precise control of the rotation of the eye feature area 110. In other implementations the guides be made of a ferrous metal or magnetic material, may have a pitch linkage 804 that comprises small magnets at either end, may have the ball bearing 906 or 908 comprised of a magnet, or some other combination of structures having magnetic and/or ferrous properties to couple the eye feature area 110 to the pitch arm 802 with minimal or no backlash. Other implementations may couple the pitch arm 802 to the eye feature area 110 through a zero-backlash ball joint, a plurality of small bearings, or a flexure joint.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Application No. 62/966,347, filed Jan. 27, 2020 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An eye cartridge for use with a robotic head frame, the eye cartridge comprising:
 an eye cartridge frame;
 a first actuator mounted at a first location on the eye cartridge frame, the first actuator having a first actuator output;
 a first eye feature mount coupled to the first actuator output, wherein the first eye feature mount is rotatable about a first axis in response to operation of the first actuator;
 a second actuator mounted at a second location on the eye cartridge frame that is spatially separated from the first location, the second actuator having a second actuator output;
 a first mechanical linkage comprising a first linkage coupled to the second actuator output, a second linkage coupled to the first eye feature mount, and a first movable joint formed between the first linkage and the second linkage, wherein the first mechanical linkage is movable in response to operation of the second actuator, and wherein the first eye feature mount is rotatable about a second axis in response to movement of the first mechanical linkage, wherein the second axis is parallel to and laterally offset from an actuator axis of the second actuator; and a set of couplers disposed in spaced relation on a peripheral wall of the eye cartridge frame, wherein the set of couplers engage a complementary set of couplers on the robotic head frame when the eye cartridge is received in a socket in the robotic head frame.

2. The eye cartridge of claim 1, wherein the set of couplers comprise a set of magnetic couplers.

3. The eye cartridge of claim 1, further comprising:
a set of electrical contacts coupled to the eye cartridge frame, wherein the set of electrical contacts engage a complementary set of electrical contacts on the robotic head frame when the eye cartridge is received in the socket in the robotic head frame.

4. The eye cartridge of claim 3, wherein the set of electrical contacts comprise a set of spring-loaded electrical contacts.

5. The eye cartridge of claim 3, wherein the set of electrical contacts comprise a set of spring-loaded pins that are biased against compression.

6. The eye cartridge of claim 3, further comprising:
an image sensor communicatively coupled to the set of electrical contacts, wherein the image sensor is coupled to the eye feature mount and movable therewith.

7. The eye cartridge of claim 1, wherein the first eye feature mount is movably coupled to the eye cartridge frame.

8. The eye cartridge of claim 1, further comprising:
a first eye feature coupled to the first eye feature mount, wherein the first eye feature visually resembles at least an iris and pupil portion of a human eye.

9. The eye cartridge of claim 8, further comprising:
an image sensor coupled to an optically transparent portion of the first eye feature and positioned relatively inward of the first eye feature, wherein the image sensor is movable with the first eye feature mount.

10. The eye cartridge of claim 8, further comprising:
a third actuator mounted at a third location on the eye cartridge frame, the third actuator having a third actuator output;
a second eye feature mount coupled to the third actuator output, wherein the second eye feature mount is rotatable about a third axis in response to operation of the third actuator;
a fourth actuator mounted at a fourth location on the eye cartridge frame that is spatially separated from the third location, the fourth actuator having a fourth actuator output; and
a second mechanical linkage comprising a third linkage coupled to the fourth actuator output, a fourth linkage coupled to the second eye feature mount, and a second movable joint coupling the third linkage to the fourth linkage, wherein the second eye feature mount is rotatable about a fourth axis in response to operation of the fourth actuator and movement of the second mechanical linkage.

11. The eye cartridge of claim 10, further comprising a second eye feature coupled to the second eye feature mount, wherein the second eye feature visually resembles at least an iris and pupil portion of a human eye.

12. The eye cartridge of claim 11, further comprising:
a first image sensor optically coupled to an optically transparent area of the first eye feature, wherein the first image sensor is coupled to the first eye feature mount and positioned relatively inward of the first eye feature; and
a second image sensor optically coupled to an optically transparent area of the second eye feature, wherein the second image sensor is coupled to the second eye feature mount and positioned relatively inward of the second eye feature.

13. The eye cartridge of claim 10, further comprising:
a first set of electrical contacts coupled to the eye cartridge frame, wherein the first set of electrical contacts engage a complementary first set of electrical contacts on the robotic head frame when the eye cartridge is received in the socket in the robotic head frame;
a second set of electrical contacts coupled to the eye cartridge frame, wherein the second set of electrical contacts engage a complementary second set of electrical contacts on the robotic head frame when the eye cartridge is received in the socket in the robotic head frame;
a first control circuit mounted on the eye cartridge frame and electrically coupled to the first set of electrical contacts, the first actuator, and the second actuator; and
a second control circuit mounted on the eye cartridge frame and electrically coupled to the second set of electrical contacts, the third actuator, and the fourth actuator.

14. The eye cartridge of claim 1, further comprising:
a control circuit mounted on the eye cartridge frame and communicatively coupled to one or both of the first and second actuators, wherein the control circuit comprises at least one of a microcontroller or a microprocessor.

15. The eye cartridge of claim 1, further comprising:
a first mechanical eyelid movably coupled to the eye cartridge frame; and
a third actuator mounted on the eye cartridge frame and having a third actuator output coupled to the first mechanical eyelid, wherein the third actuator is operable to rotate the first mechanical eyelid about a third axis to selectively expose or occlude at least a portion of the first eye feature mount.

16. A robotic head comprising:
a robotic head frame having a facial area and a first socket in the facial area, a first set of couplers, and a first set of electrical contacts; and
a first eye cartridge disposed within the first socket and removably attached to the robotic head frame, the first eye cartridge comprising:
an eye cartridge frame;
a first actuator mounted at a first location on the eye cartridge frame, the first actuator having a first actuator output;
a first eye feature mount coupled to the first actuator output, wherein the first eye feature mount is rotatable about a first axis in response to operation of the first actuator;
a second actuator mounted at a second location on the eye cartridge frame that is spatially separated from the first location, the second actuator having a second actuator output;
a first mechanical linkage comprising a first linkage coupled to the second actuator output, a second linkage coupled to the first eye feature mount, and a first movable joint coupling the first linkage to the second linkage, wherein the first eye feature mount is rotatable about a second axis in response to operation of the second actuator and movement of the first mechanical linkage, wherein the second axis is parallel to and laterally offset from an actuator axis of the second actuator;

a second set of couplers disposed on the eye cartridge frame and detachably engaged with the first set of couplers; and a second set of electrical contacts coupled to the eye cartridge frame and detachably engaged with the first set of electrical contacts.

17. The robotic head of claim 16 wherein the electrical contacts of the second set of electrical contacts comprise a set of spring loaded electrical contacts.

18. The robotic head of claim 16 wherein the electrical contacts of the second set of electrical contacts comprise a set of spring loaded pins that are biased against compression.

19. The eye cartridge of claim 16, wherein the second set of couplers comprise a set of magnetic couplers.

20. A robotic eye comprising:
a frame;
a first actuator mounted at a first location on the frame, the first actuator having a first actuator output;
an eye feature mount coupled to the first actuator output, wherein the eye feature mount is rotatable about a first axis in response to operation of the first actuator;
a second actuator mounted at a second location on the frame that is spatially separated from the first location, the second actuator having a second actuator output;
a mechanical linkage comprising a first linkage coupled to the second actuator output, a second linkage coupled to the eye feature mount, and a first movable joint coupling the first linkage to the second linkage, wherein the eye feature mount is rotatable about a second axis in response to operation of the second actuator and movement of the first mechanical linkage, wherein the second axis is parallel to and laterally offset from an actuator axis of the second actuator, and wherein at least a portion of the mechanical linkage comprises a magnetic material;
an eye feature coupled to the eye feature mount, the eye feature comprising an optically transparent area; and
at least one image sensor coupled to the eye feature mount and positioned to capture images through the optically transparent area.

* * * * *